No. Patent Number: 4,877,829
Date of Patent: Oct. 31, 1989

United States Patent [19]
Vu et al.

[54] LIQUID COATINGS FOR BRIDGE DECKINGS AND THE LIKE

[75] Inventors: Cung Vu, Gaithersburg, Md.; Timothy J. Martin, Loxwood, England; Andrew M. Gillanders, Finchampstead, England; Bassam Sbaiti, Burnham, England

[73] Assignee: W. R. Grace & Co.-Conn., Columbia, Md.

[21] Appl. No.: 209,406

[22] Filed: May 19, 1988

[51] Int. Cl.$^4$ .............................................. C08L 75/04
[52] U.S. Cl. .................................... 524/729; 524/783; 525/123; 525/129; 525/130; 528/74.5; 427/136; 427/138; 427/385.5; 427/388.1; 428/423.1; 428/425.5
[58] Field of Search ................ 524/729, 783; 525/123, 525/129, 130; 528/74.5; 427/136, 138, 385.5, 388.1, 393; 428/423.1, 425.1, 425.5

[56]            References Cited
          U.S. PATENT DOCUMENTS

| 3,515,699 | 6/1970 | Burns et al. | 260/75 |
| 3,725,355 | 4/1973 | Parrish et al. | 252/188.3 |
| 3,941,855 | 3/1976 | Ehrhard | 260/77.5 |
| 3,993,576 | 11/1976 | Barron | 252/182 |
| 4,049,636 | 9/1977 | Mao et al. | 260/77.5 |
| 4,066,397 | 1/1978 | Carroll | 8/192 |
| 4,101,473 | 7/1978 | Lander | 260/13 |
| 4,124,573 | 11/1978 | Watabe et al. | 528/53 |
| 4,145,515 | 3/1979 | Pogozelski et al. | 528/77 |
| 4,225,696 | 9/1980 | Colpitts et al. | 528/76 |
| 4,376,834 | 3/1983 | goldwasser et al. | 521/159 |
| 4,410,059 | 10/1983 | Nishino et al. | 428/425.8 |
| 4,433,128 | 2/1984 | Wick | 528/53 |
| 4,436,896 | 3/1984 | Okamoto et al. | 156/332 |
| 4,507,336 | 3/1985 | Cenegy | 427/244 |
| 4,520,042 | 5/1985 | Smith | 427/209 |
| 4,532,316 | 7/1985 | Henn | 528/59 |
| 4,551,498 | 11/1985 | Yeater et al. | 524/424 |
| 4,554,188 | 11/1985 | Holubka et al. | 427/393.5 |
| 4,559,239 | 12/1985 | Cenegy | 427/140 |
| 4,604,445 | 8/1986 | Kay et al. | 528/64 |
| 4,680,203 | 7/1987 | Maki et al. | 427/393.6 |
| 4,689,268 | 8/1987 | Meader, Jr. | 428/413 |

FOREIGN PATENT DOCUMENTS 927642 6/1973 Canada.

OTHER PUBLICATIONS

Mobay Brochure entitled "Desmophen 1150"(1986).
Encyclopedia of Polymer Science and Technology, vol. 3, p. 25 (1965).
Encyclopedia of Polymer Science and Technology, vol. 11, p. 514 (1969).
Chemical Abstract, vol. 36:6270$^2$.
Arco Brochure entitled "Poly bd ® Resins in Urethane Elastomers".
Brochure entitled "Bayer Engineering Polymers": (apparently dated 11/85).
Technical Brochure on "352-Oldopren-S"(apparently dated 3/83).
Article-"Field Performance of Experimental Bridge Deck Membrane Systems in Vermont", Transportation Research Record, pp. 57-65 (1984) R. I. Frascoia.
Article by A. L. Meader, Jr. et al-"Development of a Cold-Poured Bridge Deck Membrane System", ASTM Special Technical Publications N. 629, pp. 164-177 (1976).
Article, M. D. McDonald-37 Concrete Bridge Deck Waterproofing Systems: in Highways and Road Construction, pp. 26-30, (Aug. 1973).
Technical Bulletin, "Hycar Reactive Liquid Polymers"; B. F. Goodrich Co. (apparently dated Jul., 1986).
Technical Brochure on "352 Oldepren S"(apparently dated 10/86).

Primary Examiner—Maurice J. Welsh
Attorney, Agent, or Firm—Charles A. Cross; W. W. McDowell, Jr.

[57]                ABSTRACT

Novel polyurethane formulations especially useful as membranes for the protection of bridge deckings. The polyurethane is prepared by mixing two components, A and B. Component A comprises castor oil, a low molecular weight polyol having a molecular wieght between 92 and about 200, preferably with an elastomer. Component B is a modified MDI, being either (i) a mix of 4,4'- and 2,4'-isomers of diphenylmethane diisocyanate or (ii) a diphenylmethane diisocyanate and its reaction product with a low molecular weight poly(oxyalkylene).

34 Claims, No Drawings

LIQUID COATINGS FOR BRIDGE DECKINGS AND THE LIKE

RELATED APPLICATIONS

Copending applications having U.S. Ser. No. 101,215, filed Sept. 25, 1987 and now U.S. Pat. No. 4,804,734, and U.S. Ser. No. 141,452, filed Jan. 7, 1988 and now U.S. Pat. No. 4,788,269, disclose and claim polyurethane resins similar to those herein.

FIELD OF THE INVENTION

The invention relates to protection of exterior surfaces, especially concrete surfaces.

BRIEF SUMMARY OF THE INVENTION

A novel polyurethane resin is applied to exterior surfaces, especially concrete surfaces subject to stress due to vehicular traffic, weather, temperature-induced dimensional changes, and the like. The invention resin is especially useful as a coating for concrete bridge deckings where asphalt is to be laid on the decking. The resin is applied as a mixture of two components, viz., (A) a polyol component and (B) a modified MDI (diisocyanate) component.

Component A consists essentially of (i) ricinoleic triglyceride (conveniently as castor oil) plus (ii) a low-molecular weight polyol (e.g., glycerol) and (iii) optionally an elastomer. Component B is one of two general types of MDI: (i) a mixture of MDI isomers, or (ii) a mixture of MDI with a prepolymer made by reacting MDI with an alkylene oxide. Either Component A or B may include a polyurethane catalyst.

BACKGROUND OF THE INVENTION

Concrete bridge deckings are commonly coated with a protective layer of asphalt (up to 15 cm thick), uniformly spread under heavy rolling equipment, which may weigh 10 metric tons or more. This asphalt layer is exposed to extremes of weather throughout the year, and will eventually develop cracks, some so small as to be practically invisible, others much larger. All are harmful, in that they permit liquid water to penetrate down to the concrete surface, where it freezes in winter and causes sizable portions of the asphalt layer to spall away. These adverse factors (freeze-shattering, traffic impact, chloride disintegration from de-icing salt, etc.) result in serious damage to the concrete traffic surface and eventually require major repairs.

Aside from asphalt-coated concrete surfaces, bridge concrete in the form of superstructure, parapets, crash barriers, etc., is also subject to attack, viz., from air- or moisture-borne industrial chemicals; spattered de-icing salt; and carbonation, i.e., gradual penetration of atmospheric carbon dioxide which then reacts with the alkaline materials in the concrete and attacks reinforcement in the concrete.

To inhibit the aforesaid destruction, it is conventional in concrete bridge construction and maintenance to apply a bridge deck membrane (BDM) to the concrete surface before laying down asphalt. Several BDM's are available. Polyurethane has been tried.

A BDM should meet a number of technical and economic criteria. It should:

(1) be impermeable to liquid water from above, yet be sufficiently permeable to permit small amounts of water vapor to escape from the concrete substrate;
(2) be solventless;
(3) be easily applied, preferably sprayable;
(4) have good adhesion to concrete;
(5) have low chloride penetration;
(6) be stable to concrete alkali;
(7) be stable under conditions of asphalt application - hard, but not brittle, yet be sufficiently flexible to cope with dimensional changes generated by temperature differentials and bridge movements; be able to tolerate application of asphalt at 170° under a 10-ton roll;
(8) provide superior adhesion of asphalt as applied to the BDM;
(9) be resistant to asphalt migration (i.e., tendency of low molecular weight hydrocarbons in asphalt to migrate into the BDM, weakening and/or destroying it).
(10) have competitive raw material costs;
(11) not discolor concrete;
(12) have prolonged life on exposed surfaces (e.g., vertical surfaces and other surfaces not asphalt-coated);
(13) be tough enough within a reasonable time for construction crews to walk on it.

An undated technical brochure entitled ♭Desmophen", available from Mobay Chemical Co., describes "Desmophen"® as a "branched polyalcohol with ether and ester groups". The brochure discloses that Desmophen® can be reacted with isocyanates (not defined) to make polyurethane coatings for concrete. The coating formulation must include molecular sieve zeolites "for thorough drying" (p. 12), and may include fillers. The coating is said to be hard and moisture resistant. There is no teaching of added elastomers. Prior to use on concrete, a primer is applied to the concrete (p. 13). The polyurethane coating may be applied to cast asphalt floorings and to steel and "bridge structures" (p. 14). Our analyses indicate that "Desmophen" contains castor oil.

Castor oil is known as a polyol reactant with diisocyanates to form urethanes. Ency. Pol. Sci. and Techn. 3, 25 (1965). Glycerol is reported to react with castor oil to transesterify the ricinoleic triglyceride molecules, providing a polyol glyceride mixture for reaction with hexamethylene diisocyanate. Op. cit. 11, 514 (1969); Chem. Abs. 36:6270$^2$.

In a brochure entitled "Bayer Engineering Polymers: (apparently dated November, 1985), Bayer UK Limited offers commercially a polyurethane made from a polyether polyol (Component A) and a modified MDI (Component B). The composition is not further given. The two components are mixed at the site, e.g., by spraying, on bridge decking or other concrete surface. The applied resin is said to cure tack-free in a few minutes and can be walked on in 20–30 minutes.

In a technical brochure on "352-Oldopren-S" (apparently dated March, 1983), Buesing & Fasch GmbH & Co. of Oldenburg, Germany, describe an MDI-based 2-component, polyurethane that provides an elastic film, useful (under asphalt) on road- and bridge-concrete surfaces.

R. I. Frascoia describes the use of four polyurethane membranes in bridge deck systems in an article, "Field Performance of Experimental Bridge Deck Membrane Systems in Vermont", Transportation Research Record, pp. 57–65 (1984). Three of the polyurethanes were asphalt-modified. Formulations are not otherwise given. Bond between bituminous pavement and membrane was rated "Poor", but overall performance was rated "Fair to Good".

Use of an "asphalt-extended urethane membrane" is described in an article b A. L. Meader, Jr. et al, "Development of a Cold-Poured Bridge Deck Membrane System", ASTM Special Technical Publications N 629, pp. 164–177 (1976).

For a good review article, especially for UK practice, see M. D. McDonald, "Concrete Bridge Deck Waterproofing Systems: in Highways and Road Construction", pp. 26–30 (August 1973). According to the article, polyurethane is blended with pitch to improve low-temperature flexibility and to reduce raw material costs; the membrane may need an epoxy primer (on concrete) and may need a surface protective layer before rolling on the final asphalt coating. "Cracking" and "chisel" tests are described.

An undated brochure, "Poly bd ® Resins in Urethane Elastomers", released by Arco Chemical Co., discloses dihydroxyl-terminated polybutadiene and its reaction with aromatic diisocyanates. Page 3 of the brochure discloses a polybutadiene, "R-45HT", with structural formula, indicating the molecular weight to be about 2,800. (This polybutadiene was used in Examples 1 and 2 below.)

In a technical bulletin, "Hycar Reactive Liquid Polymers" released by BFGoodrich Co. (apparently dated March, 1981), Hycar polymer is described as an acrylonitrile-based diol that can be reacted with MDI to provide low temperature flexibility and chemical resistance.

U. S. Pat. No. 4,680,203 (1987) discloses a polyurethane coating for bridge concrete, prepared from polyols and MDI. The polyols can be a mixture of poly(propylene oxide) (col. 1, line 65), glycerine (col. 2, line 3), and acrylonitrile-butadiene copolymer (col. 2, line 35).

U. S. Pat. No. 4,689,268 (1987) discloses a 3-layer laminate on concrete, viz., epoxy resin plus filler, a bonding agent, and a polyurethane.

U. S. Pat. No. 4,559,239 (1985) describes a 2-component (polyol-MDI) polyurethane applicable to concrete.

U. S. Pat. No. 3,725,355 discloses glycerine, polyether polyol, and an isocyanate prepolymer. The polyol can be a triol and must have a molecular weight of at least 2,000.

U. S. Pat. No. 4,507,336 (1985) describes a 2-component ("A" and "B") polyurethane, sprayable as a roof coating. "A" is (e.g.) a liquid modified MDI plus a chlorinated paraffin; "B" comprises (e.g.) a polypropylene glycol, 1,4-butanediol, and dibutyltin dilaurate catalyst.

Canadian Patent No. 927,642 (1973) describes applying a polyurethane foam directly to a roadbed (not to concrete), followed by a bitumen layer on the polyurethane foam.

The combination of MDI and poly(propylene oxide) triol is disclosed, e.g., in U. S. Pat. Nos. 3,515,699, 4,532,316, and 4,604,445. The combination of glycerol and poly(propylene oxide) triol is disclosed in U. S. Pat. Nos. 3,993,576 and 4,410,597, and the combination of MDI and glycerol in U.S. Pat. No. 4,145,515. Glycerol, poly(propylene oxide) triol, and MDI are disclosed in U.S. Pat. Nos. 4,225,696, 4,376,834, 4,436,896, and 4,551,498.

DESCRIPTION OF CERTAIN COMPONENTS

Castor oil is a well-known commercial product. It contains (depending on source) about 85 - 90% ricinoleic triglyceride, with small amounts of the glycerides of other fatty acids, e.g., oleic and linoleic. Solvent-extracted castor oil may contain small amounts of solvent, e.g., 1% toluene.

A particularly useful modified MDI comprises a mixture of 4,4'-diphenylmethane diisocyanate and the 2,4'-isomer. Mixtures of these isomers can be used preferably with the 4,4'-isomer as the major component, e.g., 95/5 (meaning 95 wt. % of the 4,4'-isomer and 5% of the 4,2'-isomer); 85/15, 80/20, etc.

Another very useful modified MDI can be made by reacting together diphenylmethane 4,4'- or 2,4'-diisocyanate (MDI) with a poly(oxypropylene) glycol of the formula:

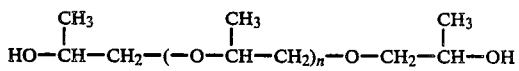

The value of n lies between 0 and 3, approximately indicating that the material is a mixture, probably with small amounts of higher and lower molecular weight polymers of the same genus. In the main reaction the MDI end-caps both ends of the poly(oxypropylene) glycol. The prepolymer thus formed may also contain small amounts of other products of the reaction, containing isocyanate and/or hydroxyl groups. The prepolymer is typically K-0-(CH$_2$CH [CH$_3$]0)$_m$-K where K is

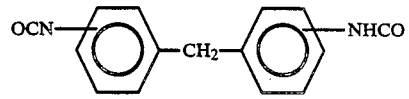

and m is about 2–5. In general, this material may be described as an MDI/polyisocyanate material comprising about 45–50 weight % MDI with the balance being the described prepolymer, i.e., with some prepolymer molecules being relatively small and others larger (depending generally on the amount of capped polyoxypropylene), but with the averages being substantially as above enumerated.

Whereas MDI is a solid, and is very difficult to handle in spray apparatus, the above described MDI/ polyisocyanate prepolymer is a homogeneous liquid and is readily sprayed.

Hycar 1300×17 is a long chain acrylonitrilebutadiene hydroxyl-terminated diol (copolymer with 17% acrylonitrile) available from BFGoodrich Co., Cleveland, OH. Weight average molecular weight is about 4,000, viscosity, 140,000 cp; hydroxyl number, 25 mg KOH/g; residual carboxyl acid number, 3.9.

Poly bd ® is a liquid dihydroxy-terminated polybutadiene, molecular weight about 2,800, available from Arco Chemical Co., as above described.

DETAILED DESCRIPTION OF THE INVENTION

Our polyurethane resin is formed basically of two components; identified for the sake of brevity as (A) and (B). (A) comprises polyols. (B) is the polyisocyanate.

(A) consists essentially of (i) castor oil plus a low molecular weight polyol with at least three hydroxyl groups and a molecular weight between 92 and about 200 and, optionally, (ii) an elastomer preferably but not necessarily with functional groups such as hydroxyl, amino, active hydrogen, etc., capable of reacting with polyisocyanate, suitably an elastomeric diol.

Representative of suitable low molecular weight polyols (with molecular weights) are:
Glycerol (92) preferred
Butanetriol-1,2,3 (106)
Trimethylolethane (120)
Pentaglycerol (120)
Erythritol (122)
Trimethylolpropane (134)
Pentaerythritol (136)
Triethanolamine (149)
Triethanolpropane (176)

The elastomer can be a material of the group: natural rubber, epoxidized natural rubber, ethylene-propylene rubber, nitrile rubber, styrene-butadiene rubber, acrylic elastomers, butyl rubber, chlorosulfonated polyethylene, neoprene, polybutadiene, polyisoprene, and the like. We prefer polybutadiene (such as Poly bd® 45HT, as above described) or an acrylonitrile-butadiene copolymer (such as Hycar 1300×17, as above described).

The elastomer functions in at least two ways. In the first place, it provides flexibility to the polyurethane membrane. This flexibility is of a type that permits the membrane to flex under the continuous flow of heavy traffic, month after month, without cracking. Secondly, this flexibility is maintained even at sub-zero temperatures.

Component B is a modified MDI, of one of two general types: (i) a mixture of MDI isomers or (ii) a mixture of MDI with a prepolymer made by reacting MDI with a lower alkylene oxide (2-4 carbons). MDI is diphenylmethane diisocyanate. It is available commercially, e.g., as a mixture of isomers, typically mixtures comprising mostly the 4,4'-isomer, with the balance of the 2,2'-isomer. A 4,4'-, 2,2'-isomer mixture is available from Dow Chemical Co. as PAPI®94. PAPI-94 is a mixture, consisting essentially of about 60-70% (i) and about 30-40% (ii), wherein (i) is a mixture of two MDI isomers, viz., about 88% of 4,4'-diphenylmethane diisocyanate and about 12% 2,4'-diphenylmethane diisocyanate; and (ii) is polymeric MDI, viz.,

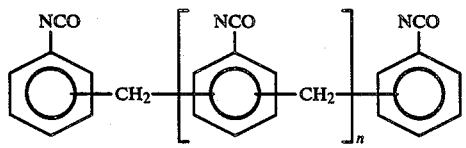

having a functionality of 2.3, wherein n is a variable in the range of 1 to 3. . Many other MDI isomer mixtures are available and useful in our invention. With respect to B- (ii), MDI (as the 2,4'- or 4,4'-isomer, or a mixture) can be reacted with an alkylene oxide to make an MDI prepolymer. As the alkylene oxide we prefer ethylene or propylene oxide. Especially useful as Component B is a modified MDI containing about 45-50 weight % 4,4'- and/or 2,4'-diphenylmethane, with the balance to make 100% being a polyisocyanate prepolymer of the structure K-0-(CH$_2$CH[CH$_3$]0)$_m$-K, where K is

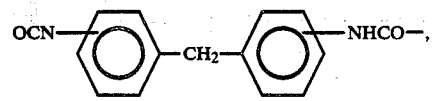

and m is about 2-5. Prepolymer polyisocyanates of this type are available as Mondur XP-744 (Mobay), Isonate 181 (Dow Chemical Co.), etc.

Catalyst/No Catalyst

Our formulations can be used with or without a catalyst, depending on the method of the application. If the formulation is sprayed or otherwise applied in such manner that the two components are admixed at the point of application, a catalyst may be desirable to ensure quick setting, i.e., dry-to-touch within minutes. On the other hand, where the components are mixed in a container, and the container is required to supply the complete polyurethane formulation over a period of time (say, 30 minutes), then not only is a catalyst inadvisable; an inhibitor may actually be necessary for the desired extended pot life. A number of polyurethane inhibitors are known, including: organic and inorganic acids, such as benzoyl chloride, p-toluene sulfonic acid, formic acid, acetic acid, benzoic acid, phosphoric acid, hydrochloric acid, and the like.

When an inhibitor is used, it is suitable about 0.01-1.0 weight % of the overall polyurethane mix.

A catalyst is recommended for spraying operations or where the formulation is to be applied to concrete immediately on mixing. For this purpose, substantially any of the conventional polyurethane catalysts (and combinations) can be used.

These catalysts include:
Tertiary amines:
  Triethylene diamine
  N-methyl morpholine
  N-ethyl morpholine
  Diethyl ethanolamine
  1-methyl-4-dimethylamino ethyl piperazine
  3-methoxy-N-dimethyl propyl amine
  N-dimethyl-N'-methyl isopropyl propylene diamine
  N,N-diethyl-3-diethyl amino propylamine
  N,N-dimethyl benzyl amine
  Dicyclohexylmethylamine
  2,4,6-tris dimethylaminomethylphenol
  N,N-dimethyl cyclohexylamine
  Triethylamine
  Tri-n-butylamine
  1,8-diaza-bichloro[5,4,0]-undecene-7
  N-methyl diethanolamine
  N,N-dimethyl ethanolamine
  N,N-dimethyl cyclohexylamine
  N,N,N'N'-tetramethyl-ethylene diamine
  1,4-diaza-bicyclo-[2,2,2]-octane
  N-methyl-N'-dimethylaminoethyl-piperazine
  Bis-(N,N-diethylaminoethyl)-adipate
  N,N-diethylbenzylamine
  Pentamethyldiethylene triamine
  N,N,N'-tetramethyl-1,3-butanediamine
  1,2-dimethylimidazole
  2-methylimidazole
Tin compounds:
  Stannous chloride
  Dibutyl tin di-2-ethyl hexoate
  Stannous octoate Dibutyl tin dilaurate
Trimethyl tin hydroxide
Dimethyl tin dichloride
Dibutyl tin diacetate
Dibutyl tin oxide
Tributyl tin acetate
Tetramethyl tin
Dimethyl dioctyl tin
Tin ethyl hexoate
Tin laurate
Dibutyl tin maleate
Dioctyl tin diacetate
  Other metal organics:
Zinc octoate
Phenyl mercuric propionate
Lead octoate
Lead naphthenate
Copper naphthenate As to the amount of catalyst(s), the preferred amount of tertiary amine catalyst is about 0.001 − 0.5%, based on the total weight of polyols plus polyisocyanate. When using a tin compound or other metal-containing catalyst, an equal amount is suitable. Mixtures of tertiary amines and organo-metallics are particularly suitable as catalysts for this invention.

Suitable ratios for certain components are:

TABLE I

|  | Workable Ranges Parts by Wt. | Preferred Ranges Parts by Wt. |
|---|---|---|
| Component A |  |  |
| Castor oil | about 90 to 140 | about 100 to 130 |
| Low MW Polyol | about 2 to 10 | about 3 to 8 |
| Elastomer | about 0 to 120 | about 20 to 100 |
| Molecular sieves | 0 to 50 | about 10 to 40 |
| Component B |  |  |
| Modified MDI | about 40 to 120 | about 50 to 110 |

Generic and preferred embodiments of the invention include:

(1) the novel combination of Components A and B as set forth in generic and specific formulations herein;

(2) the processes (generic and specific) of mixing together Components A and B aforesaid;

(3) the resins (generic and specific) resulting from (2) above;

(4) process of coating a substrate with the resins of (3) above. Substrates of particular interest are metals and concrete, e.g., bridge decking.

(5) coated metal or concrete articles resulting from (4) above;

(6) overall process of protecting metals or concrete bridge decking by applying the resins of (3) above to metals or concrete, as the case may be;

(7) as an article, bridge decking comprising concrete-polyurethane-asphalt laminate, the polyurethane being the resin of (3) above.

Mixing and Application

For small batches, such as might be needed for minor repair work to decks and parapets, the two Components A and B can be mixed in an open container at room temperature, and the mixture can then be spread on the concrete surface. To extend pot life, it may be desirable to eliminate the catalyst, or even to use an inhibitor. For general large scale work (and the resin is designed for this) a conventional two-liquid air spray gun is recommended for best results.

Application to the deck surface is suitably made at ambient temperature, preferably above freezing. The coated substrate is rapidly tack-free and cures at ambient temperature.

It is preferred that the resin be applied to a dry surface. However, some dampness can be tolerated. Following conventional practice, we prefer to spray the surface with a primer.

We prefer to apply about 1 − 5 kg resin/meter$^2$ of surface. We can apply this as one, or, suitably, two or more coats. This makes a film of about 1 − 5 mm thickness. For deckings subject to extremely heavy traffic, we prefer the upper levels of these ranges.

The following examples illustrate without limiting the invention.

EXAMPLE 1

This represents a preferred embodiment of the invention. A polyurethane coating was prepared from two components, A and B, in parts by weight given as about:

|  | Parts by Weight |
|---|---|
| Component A |  |
| Castor oil | 100 |
| Glycerine | 6.2 |
| Polybutadiene[1] | 25 |
| Molecular sieves in castor oil, 1:1 | 40 |
| CaCO$_3$ | 40 |
| Cr$_2$O$_3$ | 3.2 |
| Fumed silica[2] | 1.8 |
| Dibutyl tin dilaurate | 0.47 |
| Component B |  |
| Modified MDI (Mondur XP-744) | 107.8 |

[1]Poly bd ®, above described.
[2]Thixotropic aid, available as Aerosil R-202, Degussa.

The ingredients listed under Component A were mixed to form Component A, which was then mixed with Component B. Reaction occurred instantaneously. The resulting polyurethane can be sprayed or doctored onto concrete or other substrate. The coating cures within minutes. Preliminary tests show that the coating is very hard, stands up to 200° C for at least 1 hour, and adheres well to concrete. It has a particular advantage in that it is hydrophobic and resists reaction with moisture, thereby greatly diminishing formation of bubbles in the coating.

EXAMPLE 2

Control-Omission of Glycerol

Several runs were made following substantially the procedure of Example 1 except that no glycerol or other low molecular weight polyol was added. The resulting polyurethanes were too soft for serious consideration as a BDM.

Fillers in the above formulations (e.g., molecular sieves and fumed silica) assist in viscosity control of the liquid polyurethane, aid in leveling the coating, and act as moisture absorbers. (See, e.g., U. S. Pat. No. 4,567,230 re molecular sieve moisture absorbers.) The moisture comes not from the resin, but rather from the underlying concrete and from the atmosphere. Even well-cured concrete tends to release water vapor, which tends to form blisters in BDM's, especially in freshly laid membranes. The demoisturizing fillers can, however, be omitted, with acceptable results.

In the general case, and especially in humid conditions, molecular sieves should be added to the formulation when it is to be sprayed. The spray droplets tend to absorb atmospheric moisture, and this moisture reacts with the polyisocyanate to release carbon dioxide, which causes foaming in the membrane with consequent severe deterioration of properties in the cured membrane. Molecular sieves inhibit this foaming by absorbing moisture before it can react with the polyisocyanate component. When molecular sieves (or equivalent moisture absorber) is used, a suspending (thixotropic) agent is preferably used to maintain the molecular sieves in suspension. These materials are well known and are available commercially.

It is expected that the coatings of this invention will meet the following tests.

Tests

Tests derived from the British Board of Agreement (B.B.A.):
  Water vapor permeability (similar to ASTM E-96, Method B).
  Resistance to chloride ion.
  Resistance to cracking.
  Resistance to water penetration (similar to ASTM E-96).
  Resistance to chisel impact.
  Resistance to ball indentation.
  Resistance to aggregate indentation.
  Tensile bond (adhesion)
Test originating in laboratories outside the B.B.A.:
  Asphalt migration.
  Certain of the above tests are summarized below.

So far as we are aware, there are no official requirements (whether at the national or state level) for polyurethane or other BDM's. However, the construction industry has come to expect certain properties, and the chemical industry has attempted to meet these expectations. Such parameters have on occasion been offered as guidelines, as distinct from requirements. In general, the tests, however, defined and formulated, aim at demonstrating properties that meet practical problems of actual road use, as elsewhere delineated. Some of the tests have been developed by official agencies (e.g., the British Board of Agreement), some by the construction industry, some by the American Society for Testing Materials (ASTM), and some by suppliers of polyurethane components.

The following, for example, are summarized from Appendix B, Department of Transport Checks and Tests for the Approval of Waterproofing Systems for Concrete Decks to Highway Bridges, published by the British Board of Agreement, and speaks as of 1987:

(1) Water vapor permeability. (Test per British Standards 3177:1959.) Permeability of water at 25° C and 75% relative humidity should not exceed 15 g/m$^2$/day.

(2) Resistance to chloride ion. Concentrated NaCl solution on upper side of membrane, distilled water on lower. After 7 days no Cl ion penetration as shown by silver nitrate added to lower container.

(3) Resistance to cracking. Concrete slab is coated, then pressure applied incrementally from the other side to crack the slab. It is desirable that the crack in the slab reach 2.5 mm before fracturing the coating to create a visible 12 mm-long fracture in the coating.

(4) Resistance to water penetration. Samples supported on gauze are subjected to 6,010 kg/m$^2$ water pressure for 24 hours without penetration.

(5) Resistance to chisel impact. Total of 40 impacts in different positions, at 20° C and 0° C, with a chisel weighing 1 kg, with head 20 mm wide and 90° tip angle, dropped in guides. Aim is less than 5% punctures.

(6) Tensile bond. 150 mm square samples applied concrete blocks, then steel plates adhered to upper surface. Load required to pull the membrane from the concrete should not be less than 1,200 N.

(7) Resistance to indentation (ball). Sample 200 mm ×200 mm bonded to steel plate, then 20 mm-diameter steel ball pressed into sample for 5 minutes at 400 N. Penetration to the plate is determined by addition of salt solution to the indentation and attempted passage of electric current (1,000 v) therethrough. With replications. The polyurethane should not be penetrated.

(8) Aggregate indentation. 150 mm square sample of polyurethane on concrete slab is topped with a layer of 14–22 mm crushed granite aggregate and a load of 5,625 kg is applied for 5 minutes. The polyurethane should not be penetrated. (This test is no longer in the B.B.A.)

Asphalt Migration

Dip coupon with 2 mm-polyurethane coating in asphalt at 175° C for 1 hour. Recover, determine by visual inspection whether asphalt has migrated into the polyurethane, or whether coating is embrittled, is discolored, or has otherwise deteriorated.

Some of these tests point to seemingly contradictory requirements; for example, the perfect membrane should be tough and hard, permitting the overlay of hot asphalt by heavy equipment, but at the same time the membrane must be sufficiently flexible and elastic so that if the underlying concrete cracks, the membrane will not likewise crack. Perhaps the perfect membrane does not exist. Our preferred formulations, on the other hand, are expected to meet major requirements.

Besides molecular sieves and thixotropic agents, we can also add antioxidants, reinforcing agents, plasticizers, UV stabilizers, pigments, fillers, and corrosion inhibitors, in amounts ranging from about 0.01 to 25% by weight of the total composition.

Percentages are by weight unless otherwise stated.

We claim:

1. Composition consisting essentially of two separate components, A and B;
    Component A consisting essentially of, in parts by weight, (i) about 90 – 140 parts of castor oil; (ii) a low molecular weight polyol having at least 3 hydroxyl groups and a molecular weight between 92 and about 200, 2 – 10 parts; and (ii) an elastomer, about 0 – 120 parts;
    Component B, about 40 – 120 parts; being a polyisocyanate of the group consisting of (i) isomers of diphenylmethane diisocyanate and (ii) a mixture of diphenylmethane diisocyanate and the reaction product of diphenylmethane diisocyanate with an alkylene oxide adduct of a polyol.

2. Composition according to claim 1, wherein Component B, (i) is a mixture comprising 4,4'-diphenylmethane diisocyanate and, 2,4'-diphenylmethane diisocyanate wherein the 4,4'-isomer is in the majority; and (ii) is a polyisocyante material comprising about 45-50 weight % to make 100% of a polyisocyanate of the structure K-O-(CH₂CH[CH₃]O)$_m$-K, where K is

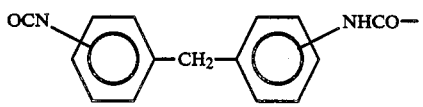

and m is about 2-5.

3. Composition according to claim 1, wherein the elastomer is polybutadiene or an acrylonitrile-butadiene copolymer; and the weight ratio of castor oil: low molecular weight polyol: elastomer:Component B is about 100 – 130: 3 – 8: 20 – 100: 50 – 110.

4. The composition of claim 1 wherein Component A contains in addition at least one additive selected from the group consisting of polyurethane catalyst, polyurethane inhibitor, molecular sieves, thixotropic agents, anti-oxidants, reinforcing agents, plasticizers, UV stabilizers, pigments, fillers, and corrosion inhibitors.

5. The composition according to claim 4 in which the additive is molecular sieves.

6. Composition according to claims 1, 2, 3, 4, or 5 wherein Component B is group member (i).

7. Composition according to claim 6 wherein group member (i) consists essentially of about 60-70% (a) and about 30-40% (b), wherein (a) comprises about 88% 4,4'-diphenylmethane diisocyanate and about 12% 2,4'-diphenylmethane diisocyanate and (b) comprises polymeric MDI of the formula

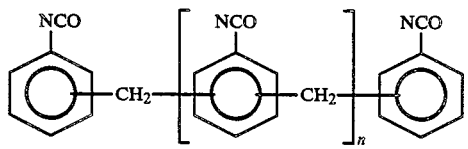

having a functionality of 2.3, wherein n is a variable in the range of 1 to 3.

8. Composition according to claims 1, 2, 3, or 4, wherein Component B is group member (ii).

9. Composition according to claim 8 where Component B is a polyisocyanate material comprising about 45-50 weight % of 4,4'- or 2,4'-diphenylmethane and balance to make 100%, of a polyisocyanate of the structure K-0-(CH₂CH[CH₃]0)$_m$-K, where K is

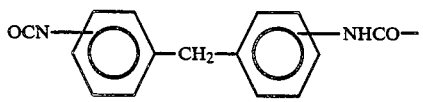

and m is about 2-5.

10. Composition according to claim 1 wherein in parts by weight,

| Component A consists essentially of: |
|---|
| Castor oil, about 100; |
| Glycerol, about 6.2; |
| Polybutadiene, about 25; |
| Molecular sieves in castor oil, 1:1, about 40 |
| CaCO₃ 40; |
| Cr₂O₃ 3.2; |
| Fumed silica 1.8; |
| Dibutyl tin dilaurate 0.47; and |
| Component B consists essentially of group member (ii), about 107.8. |

11. A polyurethane resin, said resin being the product obtained by reacting together Component A and Component B as defined in claim 1.

12. Polyurethane resin according to claim 11 wherein Components A and B are as defined in claim 2.

13. Polyurethane resin according to claim 12 wherein Components A and B are as defined in claim 10.

14. Process of forming a polyurethane resin comprising intimately mixing together two components, A and B, as defined in claim 1.

15. Process according to claim 14 wherein Component A and Component B are as defined in claim 2.

16. Process according to claim 15 wherein Component A and Component B are as defined in claim 10.

17. Process of coating a substrate comprising applying thereto the resin of claim 11.

18. Process according to claim 14 wherein the resin is that of claim 12.

19. Process according to claim 14 wherein the resin is that of claim 13.

20. Process according to claim 17, 18 or 19 wherein the substrate is concrete.

21. Process according to claim 17, 18 or 19 wherein the substrate is metal.

22. Process according to claim 20 wherein the concrete is bridge decking.

23. Article comprising a substrate and a film coating adhered thereon, said film coating comprising the resin of claim 11.

24. Article according to claim 23 wherein the film coating comprises the resin of claim 12.

25. Article according to claim 23 wherein the film coating comprises the resin of claim 13.

26. Article according to claim 23, 24 or 25 wherein the substrate is concrete.

27. Article according to claim 23, 24 or 25 wherein the substrate is metal.

28. Article according to claim 25 wherein the concrete substrate is bridge decking.

29. Process of aiding in the protection of concrete bridge decking from damage due to traffic, road salt, weather, and associated injury-sources, wherein a polyurethane membrane is applied to the surface of the concrete decking followed by an asphalt layer; characterized in that the polyurethane is the resin defined in claim 11.

30. Process according to claim 29 in which the polyurethane is the resin of claim 12.

31. Process according to claim 29 in which the polyurethane is the resin of claim 13.

32. Article comprising concrete bridge decking having a layer of polyurethane resin of claim 11 applied thereon, plus a layer of asphalt on the resin layer.

33. Article according to claim 32 wherein the resin is the resin of claim 12.

34. Article according to claim 32 wherein the resin is the resin of claim 13.

* * * * *